Sept. 9, 1958 P. A. SIDELL 2,851,578
ELECTRICAL HEATING CIRCUIT
Filed Nov. 8, 1954 3 Sheets-Sheet 1

Inventor:
Philip A. Sidell
By: Brown, Jackson, Boettcher & Dienner
Attys.

Sept. 9, 1958 P. A. SIDELL 2,851,578
ELECTRICAL HEATING CIRCUIT
Filed Nov. 8, 1954 3 Sheets-Sheet 2
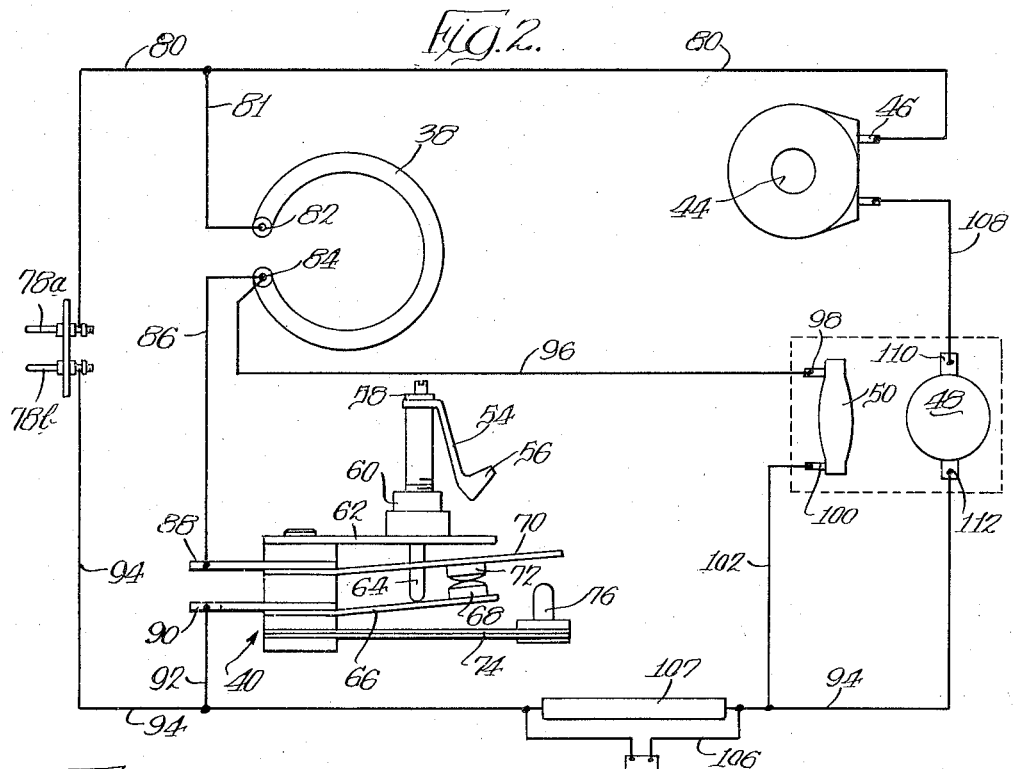
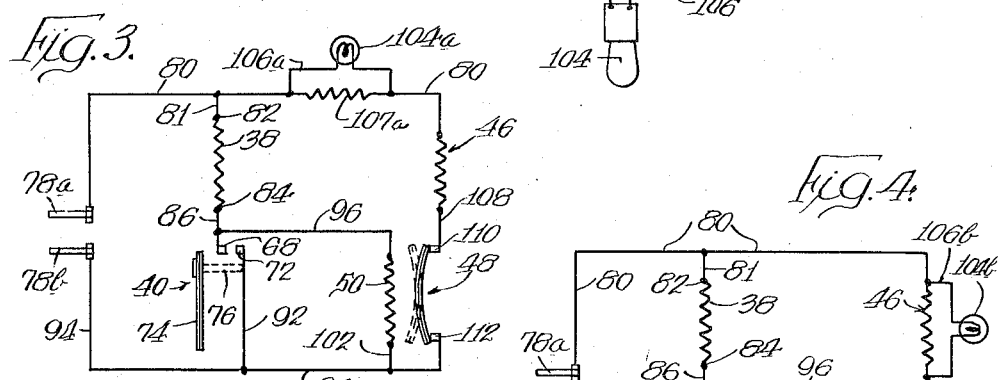
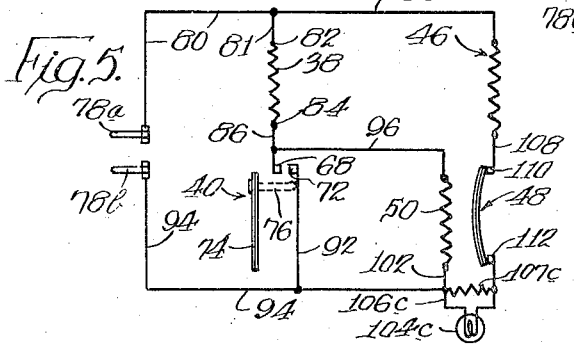
Inventor:
Philip A. Sidell
By: Brown, Jackson,
Boettcher & Dienner
Attys.

Sept. 9, 1958 P. A. SIDELL 2,851,578
ELECTRICAL HEATING CIRCUIT
Filed Nov. 8, 1954 3 Sheets-Sheet 3
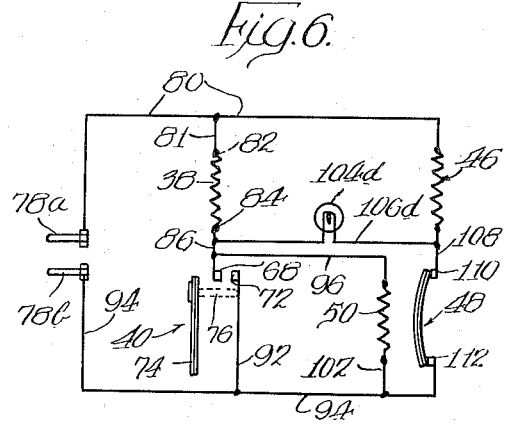
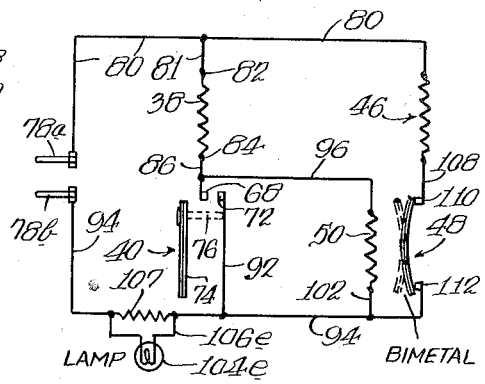
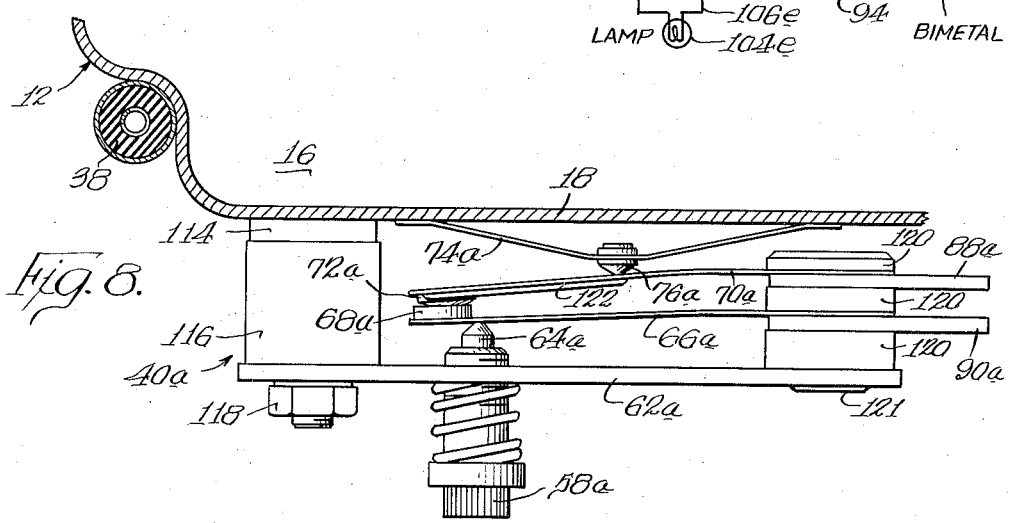
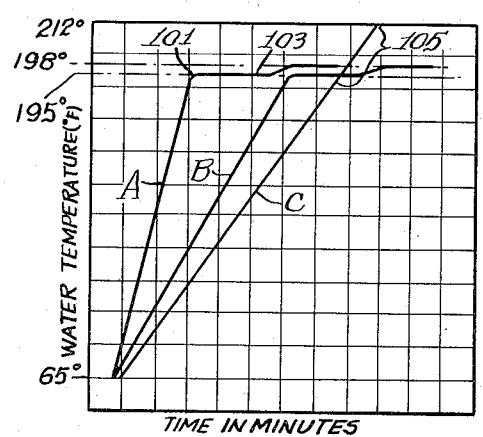
Inventor:
Philip A. Sidell
By: Brown, Jackson,
Boettcher & Dienner
Attys.

2,851,578

ELECTRICAL HEATING CIRCUIT

Philip A. Sidell, Chippewa Falls, Wis., assignor to National Presto Industries, Inc., Eau Claire, Wis., a corporation of Wisconsin Application November 8, 1954, Serial No. 467,371

14 Claims. (Cl. 219—44)

My invention pertains to an electrical heating circuit. It is suited for use in conjunction with a percolator type of coffee maker such as is shown and described in my co-pending application Serial No. 465,611, filed October 29, 1954. Accordingly, the invention will be described in such use, although it may well have other uses.

In brewing coffee, it is necessary to bring water into contact with coffee grounds within a certain temperature range. The flavor of the coffee depends upon the amount of coffee used and the temperature of the water at which the brewing takes place. Generally speaking, changing the length of percolating time at a given water temperature with a given amount of coffee will not change the strength of the coffee after the percolating action has gone on for approximately four minutes.

Of course, if the coffee is subjected to boiling water, there is a tendency for bitter astringent compounds present in the coffee to be "boiled out" into the coffee brew, thereby giving it an unpleasant taste. If the temperature of the water is too low, on the other hand, the extraction of the coffee flavor may either be insufficient or at least will require a substantially longer period of brewing time. It would be desirable, therefore, to bring the water to a preselected temperature quickly and, in a percolator type of coffee maker as illustrated here, to then percolate the heated water through the coffee grounds for a certain length of time at that temperature. Additionally, it would be very desirable to be able to keep the brewed coffee at a desired drinking temperature after the percolating action is completed. It is a broad object of my invention to realize those desires by the electrical heating circuit here disclosed.

For a better appreciation of the present invention, a brief discussion of some existing forms and prior forms of percolator type of coffee makers is appropriate. In the old fashioned stove-type of coffee percolator, there was a percolator tube and basket assembly and a percolating "umbrella" at the lower end of the tube, all positioned inside of a container. In such device, the entire body of water was frequently brought to a boiling condition and the steam which was trapped by the umbrella was fed into and up the percolating tube to be discharged at its upper end. The steam carried up a certain amount of water which dropped into the basket and percolated through the coffee grounds to extract the coffee brew therefrom. Since it is difficult in such a device to prevent boiling, a bitter type of brew frequently resulted. The device had no accurate controls and was manipulated entirely by hand in trying to arrive at a good coffee brew. About the only control was the amount of coffee used, and the user's judgment in how long the boiling water should be permitted to pass through the grounds.

Many current so-called "automatic" percolator type of coffee makers on the market follow essentially the same procedure as the stove-type except that they have electric heating units instead of depending upon a flame. Some of them also have a thermostat to control the heating unit. However, they generally use a single heating element and a single thermostat. The wattage of the heating element must be kept low enough to give sufficient time to brew the coffee (before shutting off) when small amounts of water are used. But such low wattage then results in an excessive time for the coffee making cycle when larger quantities of water are used. With such devices having a single heating element and thermostatic control, the temperature of the water constantly rises to the final thermostatic setting which shuts it off. This means that the water increases in temperature to a desirable brewing temperature and then in order to brew a sufficient time continues to get hotter and hotter, with the result that the aforementioned bitterness of the coffee is produced. Furthermore, the location of the thermostatic controls away from the heated fluid is generally such that there is a considerable variation in coffee quality as between brewing small and large amounts of coffee.

Another type of coffee maker consists of two vessels, the upper one having a tube adapted to extend down through the neck of the lower vessel. Water is placed in the lower vessel and coffee grounds are placed in the upper vessel along with a filter. When the water in the lower vessel is heated, water vapor and steam develop which cannot escape through the neck of the lower vessel except as water is forced up through the tube of the upper vessel, thereby filling it and saturating the coffee grounds. When the source of heat is then removed from the lower vessel, the brewed coffee is then drawn back down to the lower vessel through a filter, after which the upper vessel is removed and the lower one serves as the coffee pot. Most of these two-vessel type of coffee makers are of glass and are easily broken. They are cumbersome and require that coffee making be done in the kitchen. Furthermore, they do not have any method of accurately controlling the flavor through variations in the temperature of the water. About the only control is to vary the amount of coffee used, and the length of time that the boiling water is associated with the coffee grounds.

All of the foregoing types of coffee making devices have their limitations. In the present invention the coffee making operations are of the most desirable type, namely, the appropriate water temperature is selected for producing the strength of coffee desired and a main heating element brings the water up to the desired temperature quickly, at which time there is then the percolating action for a given period of time at the desired temperature. A second heating element is employed in connection with a percolator well which is associated with the fluid container of the coffee maker and it is that heating element which causes the percolating action after the main heater has brought the water up to desired temperature and has been shut off. Consequently, once the desired temperature is reached, there is no large amount of heat further added, only a sufficient amount to produce percolation. The control circuits for these two heaters is such that after the completion of the percolating action, the heater for the percolating well is also shut off. It remains off even if the main heater is again energized automatically to maintain the brewed coffee at a desired temperature.

My invention permits coffee brewing in this automatic manner with a single manual setting and produces a coffee brew of superior flavor.

Accordingly, among the objects of my invention are to provide an electrical heating circuit and automatic controls therefor which will produce the desired amount of heating for the purpose desired, such for example as heating a material and then, when the desired temperature has been arrived at, to discontinue the introduction of large amounts of heat and automatically to provide for a limited amount of heat to perform a second step in the heating operation for a given length of time. The foregoing is done automatically after a single manual selection of the desired temperature is made at the beginning of the operation. In terms of coffee-making in a percolator type of coffee maker, my electrical heating circuit and controls provides for heating the water to a desired percolating, or brewing, temperature by a main heater which can introduce sufficient heat to bring the water up to the desired temperature quickly. Then the main heater shuts off and a secondary heating element carries out a percolating action for a sufficient time to extract the coffee flavor from the grounds. Then that secondary heating element will be shut off. It will remain off although the main heater may be re-energized for maintaining the resulting brew at the desired temperature so that it may be ready for instant use any time. Since the percolating time is independent of the time required to heat the body of the water, either small or large amounts of coffee may be made with equally desirable results.

It is a further object of my invention to so provide the heating circuit and controls that they will permit of successive brewings of coffee with either hot or cold water without requiring a cooling down period between each "batch." More particularly, it is an object of my invention to provide a timing mechanism for the percolator heater which is so designed that when the coffee maker is disconnected, it will automatically and quickly reset itself so that a new quantity of coffee may be made immediately with little difficulty. It is not necessary, as in some other coffee making devices, to rinse it out with cold water.

It is a further object of my invention to provide heat responsive controls which accurately indicate temperature of the material being heated. In one form of my invention, the thermostatic control for the main heater is located immediately adjacent the bottom wall of the fluid container and in another form of the invention the bottom wall of the container itself forms one element of the bi-metallic heat responsive control.

It is another object of my invention to provide visual indicating means which will show when the device is in operation and also when it has completed the cycle of operation such, for example, as the completion of the percolating action in a coffee maker.

Further objects, uses and advantages of the invention will become apparent or be obvious from a consideration of the following description and the drawings, in which:

Figure 2 is a circuit diagram of the electrical heating circuit diagrammatically illustrating the heating elements and automatic controls and visual indicating means of a preferred form of the invention;

Figure 3 is another circuit diagram illustrating a modification of the circuit of Figure 2 in respect of the positioning of the visual indicating means, such as a lamp;

Figure 4 is another circuit diagram showing another modification of the location of the visual indicating means;

Figure 5 is another circuit diagram showing a modified location of the visual indicating means;

Figure 6 is another circuit diagram showing a further modification of the location of the visual indicating means;

Figure 7 is another circuit diagram showing a further modification of the location of the visual indicating means;

Figure 8 is a fragmentary enlarged view showing a heat responsive control means of modified form which includes the use of a bottom wall of the coffe making device as a portion of the bi-metallic control means; and Figure 9 is a time-temperature graph illustrating the heating and percolating temperatures such as result from the use of my electrical heating circuit.

Figure 1:
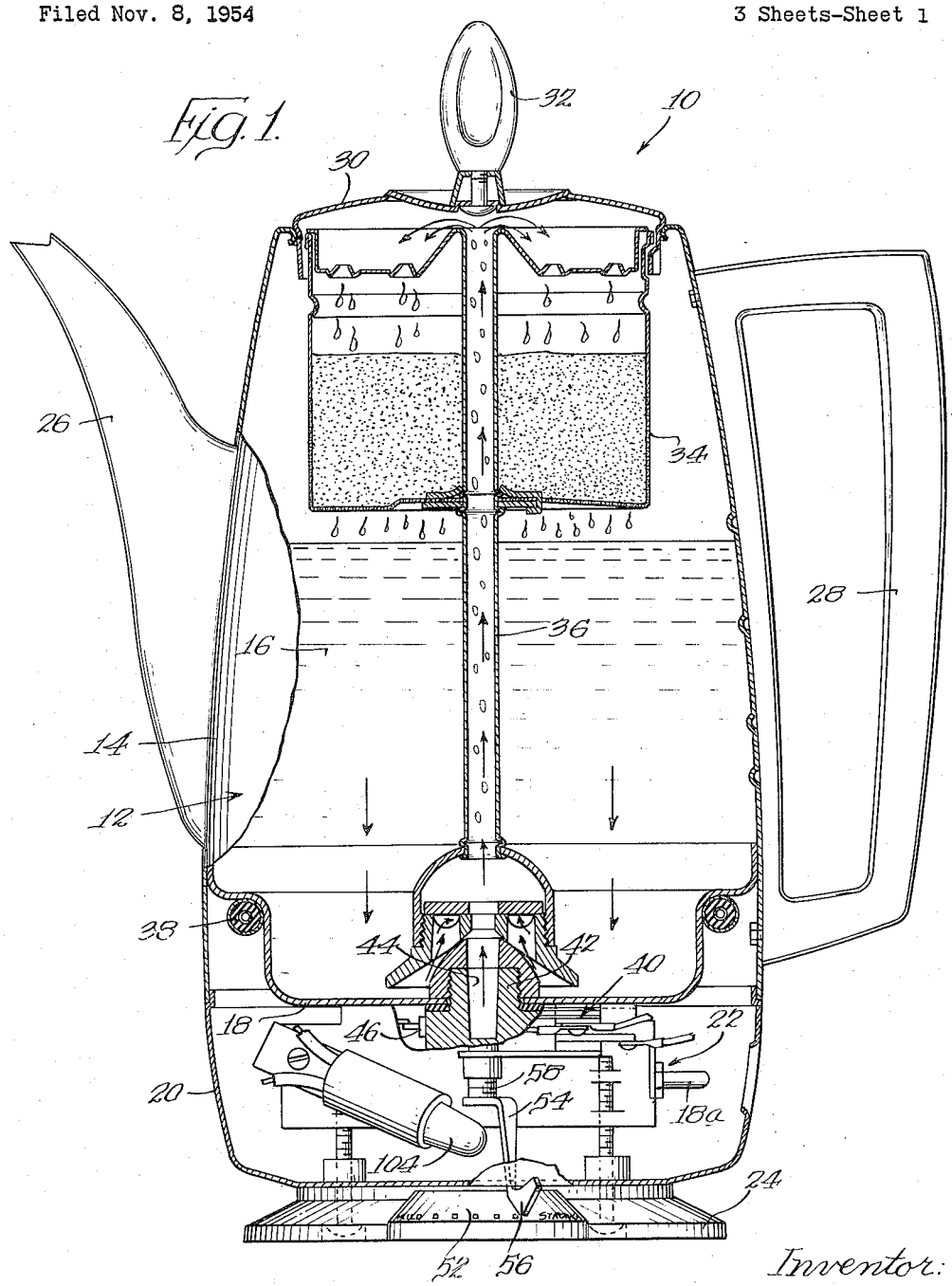
Figure 1 is a vertical elevation partially in section showing certain elements of the electrical heating circuit used in conjunction with a percolator type of coffee maker.

Considering first Figure 1, there is shown a coffee making device, indicated generally by the reference numeral 10, which has a casing 12 which includes wall means 14 defining a fluid container 16 having bottom wall means 18 and a skirt portion 20 which encloses the electrical heating circuit and controls which are indicated generally by the reference numeral 22. An insulating base is indicated at 24 beneath the skirt 20 and a pouring spout 26 extends from the fluid container 16. An insulating handle 28 is provided for lifting and manipulating the coffee maker. A closure member or lid 30 having an insulating handle 32 closes the open upper end of the fluid container 16 and is also adapted to have an interengageable connection with the coffee basket which is indicated at 34, whereby the coffee basket and associated percolating tube and its mechanism, indicated generally by the reference numeral 36, may be placed into and lifted out of the fluid container when the lid 30 is put on or removed from the coffee maker. The details of the foregoing structure are set forth in my copending application Serial No. 465,611, filed October 29, 1954.

The electrical heating mechanism and the controls therefore are illustrated in the diagram of Figure 2 and some of the elements of that diagram also appear in Figure 1. Referring, then, to Figures 1 and 2, there is provided a main heater 38 which encircles the lower portion of the wall means which defines the fluid container. By way of example, the main heater may provide 850 watts and may have a resistance of 8 ohms. It is directly in contact with the wall means and is adapted to heat the fluid in the container to the desired temperature which has been selected by manual pre-adjustment of the heat responsive control means, or thermostat, indicated generally by the reference numeral 40. Means 42, which defines the percolator well 44, has a separate heater 46, said heater being in parallel with the main heater 38. It produces 150 watts and has a resistance of 87 ohms. The two heaters are of a standard type comprising a central copper wire surrounded by magnesium oxide and encased in a copper tubing sheath.

A disk type thermostat 48 is in series with the percolator heater 46 (see Figure 2). This thermostat, when heated to a certain temperature, snaps to an open position and opens the circuit which includes the percolator heater 46. Thermostat 48 is responsive to heat produced by a 1500 ohm resistor 50 and said resistor 50 and thermostat 48 together are hereinafter sometimes referred to as a "timing means" for the percolator heater 46.

The timing means is arranged so that the active percolating period is for from four to five minutes, approximately, after the time when the water in the fluid container 16 is brought up to the desired temperature by the main heater 38.

As shown in Figure 1, the lower end 56 of the handle 54 serves as a pointer which moves over the dial 52 on the base 24. If mild coffee brew is desired, the handle 54 is set accordingly, with the result that a lower water temperature is used during the brewing operation. As may be seen from Figure 2, the handle 54 of the thermostat 40 is connected at its upper end with a post 58 which has a threaded connection (not shown) internally of a sleeve, or housing, 60 which is carried on plate 62. From the housing 60 and through the mounting plate 62 protrudes an extension member 64 of insulating material which engages the spring arm 66 which is a conductor and carries the electrical contact 68. Extension 64 passes through a slot (not shown) in arm 70 so it may engage arm 66. The other spring arm 70 is a conductor which carries the contact 72, and the two spring arms 66 and 70 are normally urged toward each other with their contacts in engagement. A bi-metal heat-responsive arm 74, carrying a button 76 of insulating material, is adapted to be disposed closely adjacent the bottom wall 18 of the coffee maker. (It will be observed from the diagrammatic circuit of Figure 2 that the thermostat 40 is inverted from the position which it actually assumes when used in the coffee maker as shown in Figure 1, since it is desired that the bi-metal heat responsive control arm 74 be closely associated with the bottom wall 18 of the fluid container 16.)

Assuming the handle position in Figures 1 and 2 corresponds to that representing a strong coffee brew, and assuming that the terminal contacts 78a and 78b of the electrical heating circuit have been connected by a standard form of electric cord to a source of electricity, for example, a wall outlet or the like, it will be seen that the current flows through line, or wire 80 and wire 81 to the terminal 82 of the main heater 38 and then through the main heater 38 to its other terminal 84. From terminal 84 a wire 86 extends to terminal 88 of the thermostat 40 and thence through arm 70, contact 72, contact 68 and arm 66 to the terminal 90 of the thermostat. From terminal 90, the wire 92 extends to the other side of the circuit, or line, 94 which returns to the terminal 78b.

From terminal 84 of the main heater 38 another wire 96 extends to the terminal 98 of resistor 50. Then from the other terminal 100 of said resistor a wire 102 extends to line 94. In line, or wire, 94 between its connections with wires 92 and 102, there is disposed the visible indicating means in the form of a lamp 104 which is in a circuit 106 which is parallel to the 4½ ohm shunt resistor 107. Wire, or line, 80 extends from terminal 78a to the heater 46 for the percolator well 44 and wire 108 extends from said heater 46 to the terminal 110 of a disk type thermostat 48. From the other terminal 112 of thermostat 48 there is a connection with the wire, or line, 94 which leads back to terminal 78b through the visible indicating means, or lamp, 104 which may be considered in series with the percolator heater 46. Lamp 104 may be a 2½ volt lamp operating at two volts by reason of shunt resistor 107 and it is so positioned within the skirt 20 of the housing 12 as to shine through an aperture (not shown) to illuminate the dial 52.

Assuming, then, that the manually controlled selector handle 54 has been set for the desired strength of the coffee brew and the coffee maker has been connected to an electrical circuit through its terminals 78a and 78b, it will be seen that immediately both the main heater 38 and the percolator heater 46 are energized through their respective heat responsive means, or thermostats, 40 and 48. By reason of the resistor 50 having such a high resistance, it will, at that time, draw a negligible amount of current and will not affect thermostat 48 which is closed at that time between its terminals 110 and 112. If a small amount of water has been placed in the fluid container 16 in order to make only a few cups of coffee, the main heater 38 will bring that water up to the preselected percolating temperature more quickly than if a larger amount of water is employed. When the water has been heated to the preselected temperature which, for example, might be in the range of 195° to 198° F., the thermostat 40 will have its contacts 68 and 72 opened by reason of the bi-metal heat responsive means 74 which has moved in a direction to engage and move the extended end of arm 70 which carries contact 72. The button 76 on bi-metal arm 74 will cause a separation of the contacts since the extension 64 on post 58, connected with manually controlled handle 54, prevents the lower arm 66, which carries contact 68, from moving in a direction to follow the arm 70 which is being acted on by bi-metal arm 74.

As soon as the circuit through wires 86 and 92 is thus broken by the thermostat 40, the resistor 50, which parallels the thermostat circuit 40, is placed in series with the main heater 38. The high resistance of resistor 50 effectively cuts off the heating effect of the main heater 38 but the percolating heater 46 continues to be energized to cause the percolating action which has gradually been starting up as the temperature of the water was raised close to the preselected temperature. Heated water and water vapor therefore rises from the percolator well 44 up through the percolating tube 36 and thence from the upper end of that tube to the coffee grounds in the percolator basket 34, whence the water drips down into the body of water in the fluid container 16. This percolating action continues until the heat generated by resistor 50 causes the heat responsive control element of the thermostat 48 to snap to an open circuit position, thereby de-energizing the percolator heater 46. At this time, lamp 104 no longer glows thereby giving a visual signal that the coffee is ready.

After thermostat 48 opens in response to the temperature from resistor 50, it remains open even at such time as the temperature of the brewed coffee cools down and causes the thermostat 40 to close for re-energizing the main heater to keep the brewed coffee at the desired temperature. If, however, the coffee maker is disconnected from the source of electrical energy, the thermostat 48 will then, when cooled, snap to a closed circuit position. In fact, the thermostat 48 is so designed that under circumstances where it is disconnected from the source of electrical energy, it will close the circuit promptly so that it is unnecessary when making a second potful of coffee to run cold water into the unit in order to actuate the thermostat 48 to closed position. As a result, successive pots of coffee may be made one after the other with cold or warm water without any delay between the successive potfuls.

It will be observed that if a milder brew of coffee is desired, that the manually controllable handle 54 of the thermostat 40 will be moved so as to cause the arm 66 to be moved closer to bi-metal arm 74 by the extension 54 of post 58, whereupon arm 70 will follow after it. By causing arm 66 to be moved closer to the bi-metal heat responsive arm 74, it will be seen that arm 70 and its outermost extension will also come close to the insulating button 76 on the bi-metal arm 74. Consequently, a lesser degree of heat is required to cause bi-metal arm 74 to move the distance necessary to engage and move arm 70 and thereby open the circuit at contacts 68 and 72.

Figure 9 is a time-temperature graph representing the temperature of the water and/or brew during the coffee making cycle. Line A indicates the temperature in a coffee making device having my electrical heating circuit and controls when approximately 14 ounces of water is used, such for example as might be the case where three cups of coffee are desired. Line B represents the temperature curve of the water and/or coffee brew in a coffee making device having my electrical heating circuit and controls wherein approximately 40 ounces of water is employed, such as might be the case where approximately eight cups of coffee are desired. Line C represents the temperature curve of existing types of electrically heated coffee making devices employing a single heating unit and single control therefor.

Considering line A, it will be appreciated that the generally vertical portion of the curve up to the point 101 represents heating of the water by the main heater 38 and percolator heater 46. At that point on the curve indicated by reference numeral 101, the temperature has reached the preselected temperature and therefore the thermostat 40 for the main heater 38 opens the circuit and the effect of the main heater 38 is then effectively eliminated due to the high resistance of resistor 50 which is then in series with the main heater 38. The remainder of the curve, indicated generally by the numeral 103, will then be seen to represent the period during which the percolating heater 46 is in operation causing the water, which has been heated to the desired temperature, to be percolated through the coffee to produce the strength desired. It will be appreciated that the horizontal portion of curve A might begin at a higher or lower temperature, depending upon the thermostatic setting of thermostat 40.

Curve B will be seen to be similar except that a greater period of time is needed for heating the larger amount of water to the selected temperature, at which time the main heater is rendered ineffective and the percolator heater causes the percolating action for such length of time as is permitted by the timing means consisting of the resistor 50 and thermostat 48. The timing mechanism is constructed so as to permit percolating action for a period of approximately five minutes, since it has been found that, for a given amount of coffee and water temperature, any percolating action after about four or four and one-half minutes has little effect upon the flavor of the coffee.

Curve C represents a straight-line curve produced by existing forms of electrically heated coffee makers which have a single thermostatic control which turns off the heat at a given temperature. It will be observed that there is no horizontal plateau since the single heater and control is used. A heater of sufficiently low wattage is necessary in such forms of coffee maker, since, with a small amount of water, a sufficient length of time must exist to effect the brewing without shutting off the device. Then when a larger amount of coffee is required, it takes a substantially longer period of time to heat the water to the brewing temperature and to complete the percolating action. In order to have sufficient time for the percolating action, the thermostatic setting must be at a temperature high enough that percolation can continue after a suitable temperature has been reached. The result of this is that after a suitable temperature has been reached for percolating action, the water must be allowed to continue to heat up past that desirable temperature in order to permit sufficient time for percolation. See part 105 of curve C. This frequently results in boiling water being used at least toward the end of the percolating action, thus causing bitter coffee to be produced.

In Figures 3 through 7, the electrical heating circuits are the same but modifications are shown in the location of the visual indicating means, or lamp, 104 and its associated shunt resistor 107. In each of these views, the circuits are indicated even more diagrammatically than Figure 2 but will show the same elements as that figure. In Figure 3, for example, the lamp 104a and its circuit 106a and associated shunt resistor 107a are disposed in series with the percolator heater 46 and lie between it and the terminal 78a. When thermostat 48 is actuated to open position, the light 104a is extinguished.

In Figure 4 it will be seen that the lamp 104b and its circuit 106b parallel the percolator heater 46 and when thermostat 48 is actuated to open position, the lamp 104b is extinguished.

In Figure 5, lamp 104c and its circuit 106c and the associated shunt resistor 107c are disposed between the terminal 112 of the thermostat 48 and the connection between line 94 and wire 102, the latter connecting with the resistor 50. Here again, when thermostat 48 is actuated to open position, the lamp 104c is de-energized.

In Figure 6, the lamp 104d (and its circuit 106d) is connected to a point on wire 108 between the percolator heater 46 and the thermostat 48, at one end, and is connected at its other end to the terminal 84 of the main heater 38 or to some point between that terminal and the thermostat 40. When thermostat 48 is actuated to open position, the lamp 104d is deenergized.

In Figure 7, the lamp 104e and its circuit 106e and associated shunt resistor 107 are disposed in line 94 between the terminal 78b and all of the circuits which include the thermostat 40, resistor 50 and thermostat 48. In this circuit, when thermostats 40 and 48 are both actuated to open circuit position, the lamp 104e will not receive enough energy to light. However, if, after percolating action, the main heater 38 is re-energized by the closing of the thermostat 40, lamp 104e will be energized to show that a heating action is going on.

Referring now to Figure 8, there is shown a heat responsive control means of modified structure from that shown at 40 in Figures 1 and 2. This heat responsive control means, or thermostat, 40a employs the bottom wall 18 of the coffee making device (or other device which is to be heated) as one element of a bi-metallic heat responsive control means in order to give a very accurate indication of the temperature of the contents of the fluid container 16. Portions of thermostat 40a which are similar to portions of thermostat 40 are here identified by the same reference numerals with the sub-letter "a" appended to the numerals. The thermostat 40a has a mounting stud 114 which is welded by its head to the under side of the bottom wall 18 of the coffee making device 10 and on said stud is disposed a spacing collar 116 against which there seats a mounting plate 62a. Plate 62a and collar 116 are maintained in position by the nut 118 being threaded onto the threaded end of the mounting stud 114.

At the other end of the mounting plate 62a there is secured in the usual fashion a group of insulating rings 120 and a mounting rivet 121 which separate and support electrical terminals 90a and 88a which are connected, respectively, with the conducting electrical spring arms 66a and 70a. Arm 66a has the electrical contact 68a at its end and arm 70a carries the electrical contact 72a at its end. Arm 70a may also have a stiffening rib 122. Arm 66a is so formed as to be urged in a direction toward the insulator extension 64a of the adjusting screw 58a (which, in use, would have connected with it a manually operable handle such as handle 54 of Figures 1 and 2). Arm 70a is normally urged in the direction of the insulating button 76a carried by the metallic strip 74a, the latter being arched at the middle and welded at its opposite ends to the under side of the bottom wall 18 of the fluid container.

The adjusting screw 58a has a threaded engagement with the mounting plate 62a so that it may be threaded toward and away from contact arm 66a. When it is threaded upwardly as viewed in Figure 8, it causes arm 66a to press against arm 70a which may, in turn, cause some bending of arm 70a about the insulating button 76a as a center. Then, when the coffee making device is energized, the main heater 38 will transmit heat to the fluid in the fluid container 16, through the bottom wall 18, and also to the metallic strip 74a which is spot welded at its opposite ends to the bottom wall 18. Bottom wall 18—being of a metal, such as copper, which has a higher coefficient of expansion than the metallic strip 74a which may be made of Invar steel—will expand a greater amount per unit of heat than the strip 74a. The result of that is that strip 74a has its midpoint drawn closer to the bottom wall. That permits the contact arm 70a and its contact 72a to move in the direction of the bottom wall 18 of the food container. In time, depending upon the extent to which arm 66a was loaded against arm 70a the insulating button 76a of the metallic strip 74a will have been withdrawn from arm 70a sufficiently to permit contact 72a to separate from contact 68a and thereby open the circuit to the main heater 38.

It will be readily seen that if the adjusting screw 58a is threaded upwardly a lesser amount, contact arms 70a and 66a and their respective contacts will separate at an earlier time with the result that the fluid in the fluid container will not be heated to as high a temperature. It will be readily apparent and appreciated that a thermostatic control such as this is a very accurate reflection of the temperature of the fluid in the container, much more than would be possible with a bimetallic heat responsive control which is disposed at a distance from the fluid container.

While I have described a preferred form of my invention, I do not intend to be limited thereto, except insofar as the appended claims are so limited, since those skilled in the art having my disclosure before them, will now readily conceive of modifications which come within the scope of my invention.

I claim:

1. In a heating circuit, first heating means adapted to be connected by one terminal to line, heat responsive means and resistor means connected in parallel to the other terminal of the first heating means and adapted to be connected to the other line, second heating means and second heat responsive means in series with each other and in parallel with said first heating means, first heat responsive means and resistor, said second heat responsive means being responsive to heat generated by said resistor to render the second heating means inoperative.

2. The heating circuit of claim 1 wherein the second heat responsive means is adapted to open and close the circuit through said second heating means, together with visible indicating means which indicates when the circuit through said second heating means is opened or closed.

3. The heating circuit of claim 2 wherein the visible indicating means is an electric lamp which ceases to glow when the circuit through said second heating means is open.

4. The heating circuit of claim 3 wherein the electric lamp is in series with said second heating means.

5. The heating circuit of claim 3 wherein the electric lamp is connected in parallel with said second heating means.

6. The heating circuit of claim 3 wherein the electric lamp connects at one end to said other terminal of the first heating means and connects by its other end to the parallel circuit which includes said second heating means and second heat responsive means at a point between said last two means.

7. An electric heating circuit for a coffee making device having means defining a fluid container and means defining an associated percolating well, said circuit comprising a main heater for heating the fluid in the fluid container, a heater for heating the fluid in the percolator well, said heaters being connected in parallel, first heat responsive means adapted to open and close a circuit which includes the main heater, said first heat responsive means being responsive to the temperature of the fluid in the fluid container, second heat responsive means adapted to open and close a circuit which includes the heater for the percolating well, and a resistor in the circuit for the main heater and in parallel with the first heat responsive means, said resistor being disposed adjacent the latter heat responsive means for controlling the same.

8. An electric heating circuit for a coffee making device having means defining a fluid container and means defining an associated percolating well, said circuit comprising a main heater for heating the fluid in the fluid container, a heater for heating the fluid in the percolator well, said heaters being connected in parallel, first heat responsive means adapted to open and close a circuit which includes the main heater, said first heat responsive means being responsive to the temperature of the fluid in the fluid container, second heat responsive means adapted to open and close a circuit which includes the heater for the percolating well, and a resistor in said circuit connected in parallel with the first heat responsive means to said main heater so as to be heated when said first heat responsive means opens the main heater circuit, said resistor being disposed adjacent the latter heat responsive means for controlling the same, said second heat responsive means being actuated by the heating of said resistor to open the circuit which it controls after the first heat responsive means opens the circuit which it controls.

9. An electric heating circuit for a coffee making device having means defining a fluid container and means defining an associated percolating well, said circuit comprising a main heater for heating the fluid in the fluid container, a heater for heating the fluid in the percolator well, said heaters being connected in parallel, first heat responsive means adapted to open and close a circuit which includes the main heater, said first heat responsive means being responsive to the temperature of the fluid in the fluid container, second heat responsive means adapted to open and close a circuit which includes the heater for the percolating well, and a resistor in parallel with said first heat responsive means and adapted to be heated when said first heat responsive means opens the circuit of the main heater, said resistor being disposed adjacent the latter heat responsive means for controlling the same, said second heat responsive means being actuated by the heating of said resistor to open the circuit which it controls after the first heat responsive means opens the circuit which it controls, thereafter said first mentioned heat responsive means being adapted to reclose its circuit to permit the main heater to supply further heat to the fluid container while said second heat responsive means maintains its circuit open.

10. An electric heating circuit for a coffee making device having means defining a fluid container and means defining an associated percolating well, said circuit comprising a main heater for heating the fluid in the fluid container, a heater for heating the fluid in the percolator well, said heaters being connected in parallel with each other, first heat responsive means adapted to open and close a circuit which includes the main heater, timing means for the percolator heater, said timing means comprising a resistor which is energized when said first heat responsive means opens the circuit which includes the main heater and said first heat responsive means, and a second heat responsive means for opening the circuit to said percolator heater, said second heat responsive means being actuated by the energizing of said resistor so as to shut off the percolator heater.

11. An electric heating circuit for a coffee making device having means defining a fluid container and means defining an associated percolating well, said circuit comprising a main heater for heating the fluid in the fluid container, a heater for heating the fluid in the percolator well, said heaters being connected in parallel with each other, first heat responsive means adapted to open and close a circuit which includes the main heater, timing means for the percolator heater comprising a second heat responsive means which is in series with the percolator heater and a resistor in parallel with the first mentioned heat responsive means and disposed adjacent said second heat responsive means, said timing means starting a timing cycle when said first responsive means opens the circuit which includes the main heater and said first heat responsive means so as to shut off the percolator heater at said cycle.

12. The circuit of claim 11 wherein the first mentioned heat responsive means comprises a pair of movable electric contacts normally urged toward each other, manually adjustable means by which the position of one contact may be controlled, and bi-metallic heat responsive means disposed closely adjacent the bottom of the means defining the fluid container and adapted to control the position of the other of said movable contacts.

13. The circuit of claim 12 wherein the contacts are normally spring loaded toward engagement with each other.

14. The circuit of claim 12 wherein one of the contacts is normally spring loaded in a direction out of engagement with the other contact.

References Cited in the file of this patent

UNITED STATES PATENTS

| | | |
|---|---|---|
| 1,963,655 | Fichtner | June 19, 1934 |
| 2,025,302 | Olds | Dec. 24, 1935 |
| 2,052,662 | Roehl et al. | Sept. 1, 1936 |
| 2,175,727 | Graham | Oct. 10, 1939 |
| 2,281,319 | Newell | Apr. 28, 1942 |
| 2,365,615 | Woodman | Dec. 19, 1944 |
| 2,461,561 | McLelland et al. | Feb. 15, 1949 |
| 2,565,638 | Victory | Aug. 28, 1951 |
| 2,584,924 | Reingruber | Feb. 5, 1952 |
| 2,610,283 | Kolisch | Sept. 9, 1952 |
| 2,651,707 | Jepson | Sept. 8, 1953 |
| 2,681,406 | Youhouse | June 15, 1954 |
| 2,694,770 | Sullivan | Nov. 16, 1954 |
| 2,696,159 | Marquis | Dec. 7, 1954 |
| 2,712,055 | Campbell | June 28, 1955 |
| 2,754,399 | Edman | July 10, 1956 |

OTHER REFERENCES

Weeks: Abstract of application Serial No. 65,938, published September 25, 1951, 650 O. G. 1196.